(12) United States Patent
Liang

(10) Patent No.: US 11,213,157 B1
(45) Date of Patent: Jan. 4, 2022

(54) SECURING DEVICE FOR CONNECTING CURTAIN TOP RAIL HOLDER TO WALL

(71) Applicant: Wen Ying Liang, Changhua County (TW)

(72) Inventor: Wen Ying Liang, Changhua County (TW)

(73) Assignee: CHING FENG HOME FASHIONS CO., LTD., Changhua County (TW)

( * ) Notice: Subject to any disclaimer, the term of this patent is extended or adjusted under 35 U.S.C. 154(b) by 0 days.

(21) Appl. No.: 17/039,698

(22) Filed: Sep. 30, 2020

(30) Foreign Application Priority Data

Jul. 29, 2020 (TW) .................................. 109209686

(51) Int. Cl.
*A47H 1/144* (2006.01)
*F16M 13/02* (2006.01)

(52) U.S. Cl.
CPC ........... *A47H 1/144* (2013.01); *F16M 13/027* (2013.01)

(58) Field of Classification Search
CPC . A47H 1/144; A47H 1/14; A47H 1/10; F16M 13/027
See application file for complete search history.

(56) References Cited

U.S. PATENT DOCUMENTS

| | | | | |
|---|---|---|---|---|
| 4,949,926 A | * | 8/1990 | Liu | E06B 9/323 16/94 R |
| 5,044,589 A | * | 9/1991 | Milne | A47H 1/124 248/265 |
| 5,529,273 A | * | 6/1996 | Benthin | A47H 1/142 248/254 |
| 6,585,208 B1 | * | 7/2003 | Fraser | A47H 1/10 248/251 |
| 8,596,594 B2 | * | 12/2013 | Shevick | E06B 9/24 248/200.1 |
| 10,794,533 B1 | * | 10/2020 | Correll | F16M 13/022 |
| 2008/0011922 A1 | * | 1/2008 | Shevick | E06B 9/266 248/254 |

* cited by examiner

*Primary Examiner* — Anita M King
(74) *Attorney, Agent, or Firm* — Che-Yang Chen; Law Office of Michael Chen

(57) ABSTRACT

A securing device includes an attachment plate and a holder. The attachment plate includes a first face attached to a wall or ceiling, and at least one bolt protrudes from the second face of the attachment plate. The holder includes a first part and a second part, wherein the first part is connected to the at least one bolt which is connected with a nut. The second part includes a first arm and a second arm. The first and second arms hold the curtain top rail. The wall of ceiling is not damaged while curtain top rail is held by the holder.

4 Claims, 7 Drawing Sheets

SECURING DEVICE FOR CONNECTING CURTAIN TOP RAIL HOLDER TO WALL

BACKGROUND OF THE INVENTION

1. Fields of the Invention

The present invention relates to a securing device for connecting a curtain top rail holder to a wall or ceiling without damaging the wall or ceiling.

2. Descriptions of Related Art

FIG. 1 illustrates the connection of a curtain top rail holder 30 to a wall or ceiling, wherein at least one bolts extend through the holder 30 and is connected to the wall or ceiling. The curtain top rail 50 is then connected to the holders 30. However, the wall or ceiling may be thin, and bolts can easily cause damage to the wall or ceiling. Extra work is required to decorate or hide the damage of the wall or ceiling.

The present invention intends to provide a securing device for connecting a curtain top rail holder to a wall or ceiling, while the wall or ceiling is not damaged.

SUMMARY OF THE INVENTION

The present invention relates to a securing device for connecting a curtain top rail holder to a wall or ceiling, and the securing devices comprises an attachment plate and a holder. The attachment plate includes a first face and a second face which is located opposite to the first face. The first face is attached to a wall or ceiling, and at least one bolt protrudes from the second face. The holder includes a first part and a second part. The first part connected to the at least one bolt which is connected with a nut. The second part includes a first arm and a second arm. The first and second arms holds the curtain top rail.

Preferably, a pad is located between the wall or ceiling and the attachment plate. The pad includes a first side and a second side which is located opposite to the first side. Each of the first and second sides includes an adherent layer. The first side is adhered to the wall or ceiling, and the second side of the pad is adhered to the first face of the attachment plate.

Preferably, the at least one bolt is embedded in a hard plastic part. A threaded section of the at least one bolt extends from the hard plastic part so as to be connected to the nut.

Preferably, the first part of the holder is secured to the second face of the attachment plate by a hard plastic connector.

Preferably, the first part of the holder is connected to the second face of the attachment plate by a mortise-tenon structure.

Preferably, the first arm is engaged with a portion of the curtain top rail, and the second arm is resiliently snapped to a lower portion of the curtain top rail.

The advantages of the present invention are that the attachment plate is attached to the wall of ceiling without using any bolt so that the wall of ceiling is not damaged while the curtain top rail is held by the holder. The curtain top rail is easily engaged with the holder manually. The curtain top rail can be adjusted by hand without any tool. The attachment plate can be replaceable when needed.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
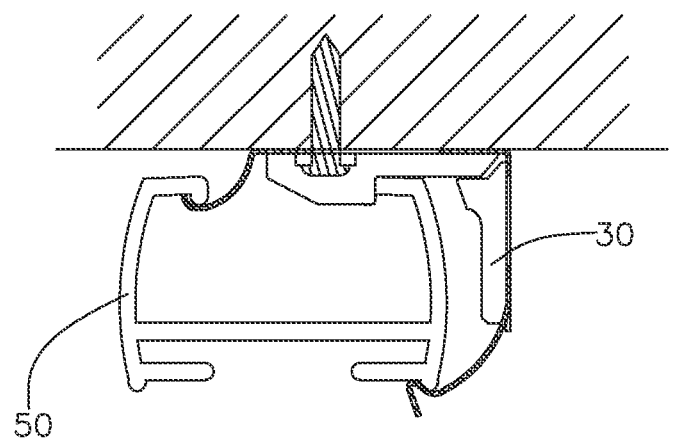
FIG. 1 shows the curtain top rail is installed to a wall or ceiling by at least one bolt.
Figure 2:
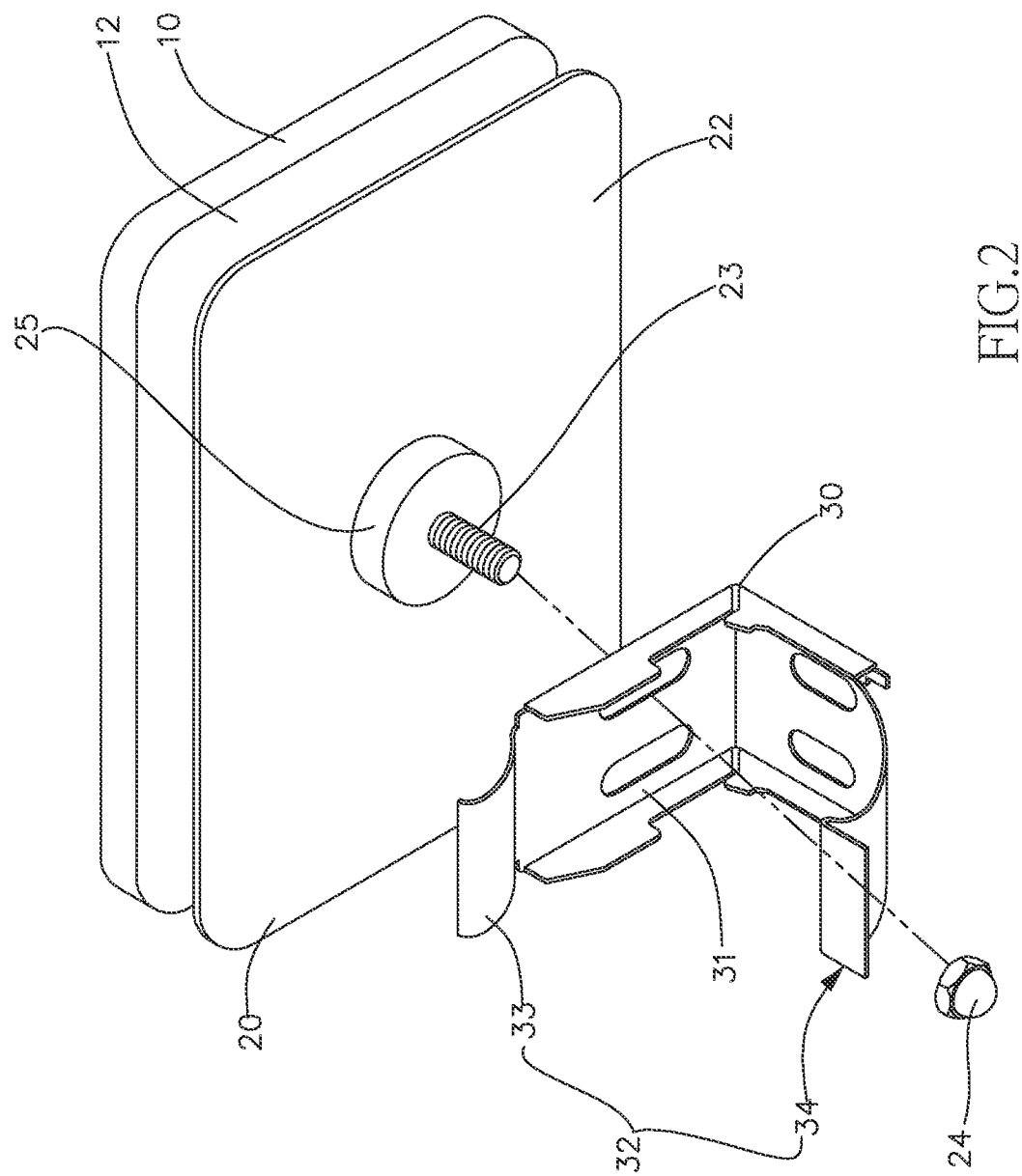
FIG. 2 shows the pad, the attachment plate, the holder, and the holder of the present invention.
Figure 3:
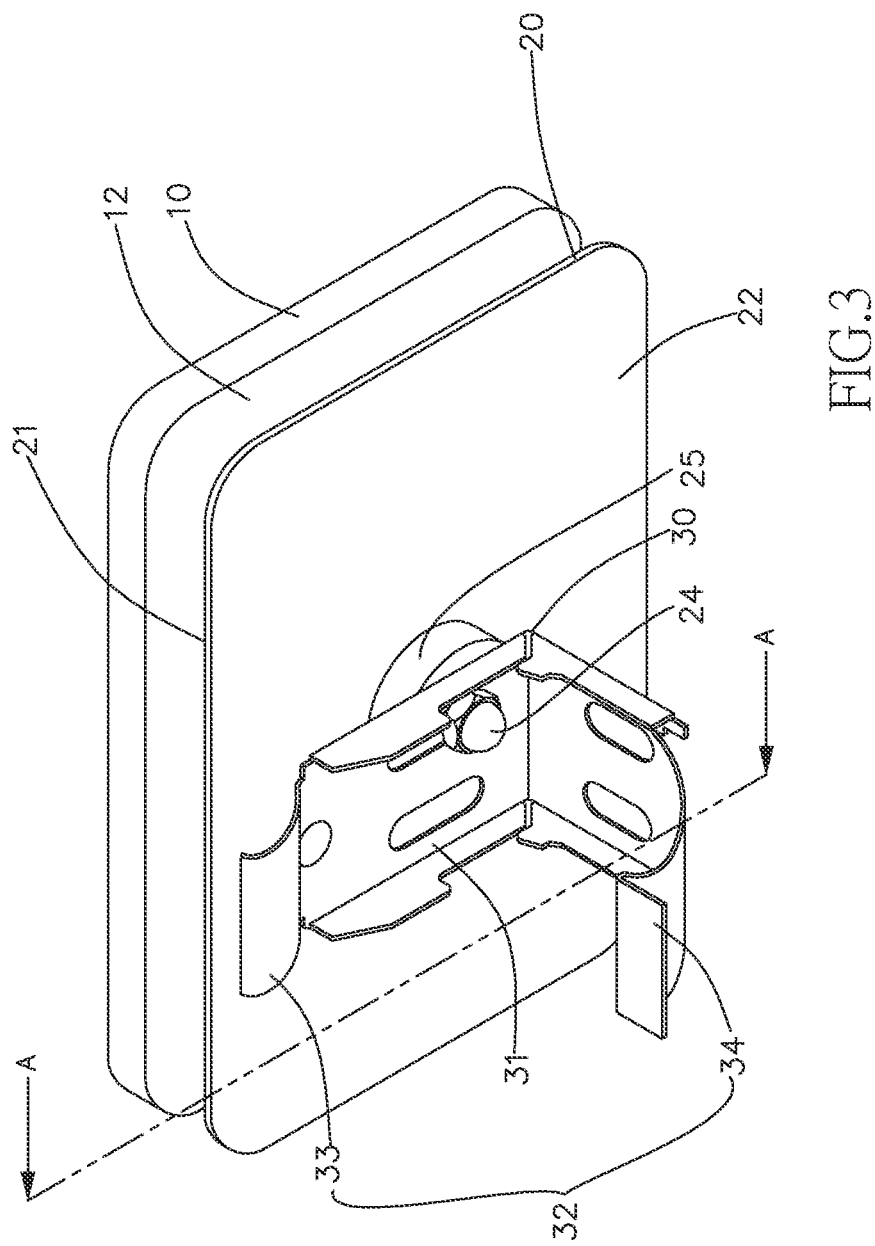
FIG. 3 shows combination of the pad, the attachment plate, the holder, and the holder of the present invention.

Referring to FIGS. 2 to 6, the securing device of the present invention comprises a pad 10, an attachment plate 20 and a holder 30. The pad 10 includes a first side 11 and a second side 12 which is located opposite to the first side 11. Each of the first and second sides 11, 12 includes an adherent layer. The first side 11 is adhered to a wall or ceiling 40. The second side 12 of the pad 10 is adhered to the attachment plate 20. It is noted that if the wall of ceiling 40 is a flat surface, the pad 10 can be omitted. The attachment plate 20 includes a first face 21 and a second face 22 which is located opposite to the first face 21. The second side 12 of the pad 10 is adhered to the first face 21 of the attachment plate 20 when necessary. Alternatively, the first face 21 is directly attached to the wall or ceiling 40. At least one bolt 23 protrudes from the second face 22.

The holder 30 is used to hold a curtain top rail 50. The holder 30 is a substantially L-shaped part and includes a first part 31 and a second part 32.

Figure 4:
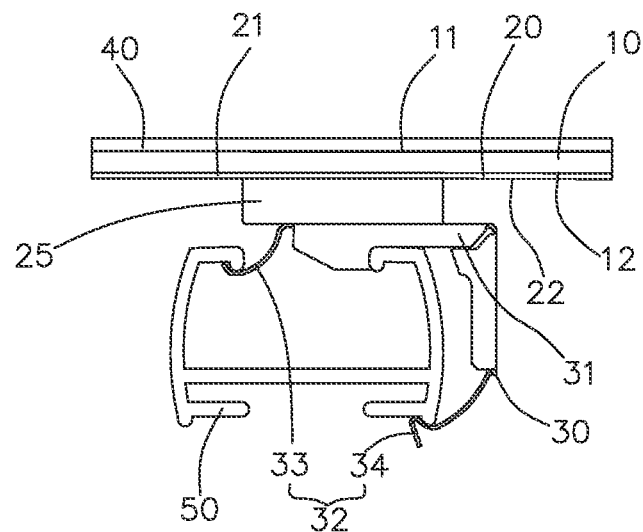
FIG. 4 is a side view show the securing device of the present invention.

The first part 31 includes at least one slot through which the at least one bolt 23 extends, and the at least one bolt 23 is connected with a nut 24 to secure the first part 31 of the holder 30 to the attachment plate 20. The second part 32 includes a first arm 33 and a second arm 34. As shown in FIG. 4, the first arm 33 is engaged with a portion of the curtain top rail 50. The second arm 34 is resiliently snapped to a lower portion of the curtain top rail 50.

Figure 5:
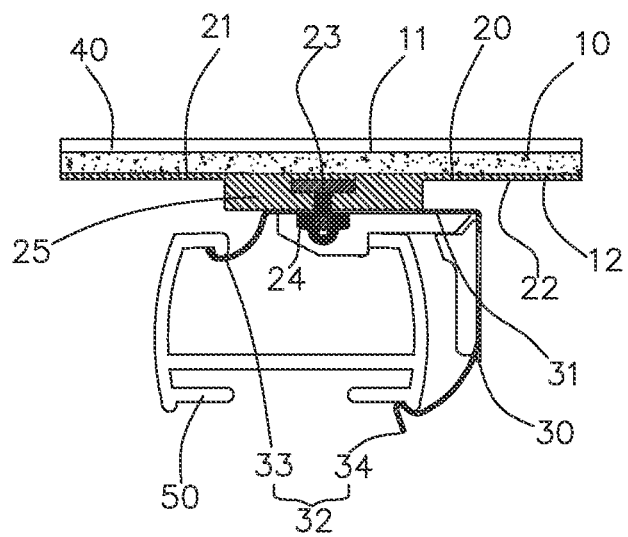
FIG. 5 is a cross sectional view, taken along line A-A in FIG. 3.
Figure 6:
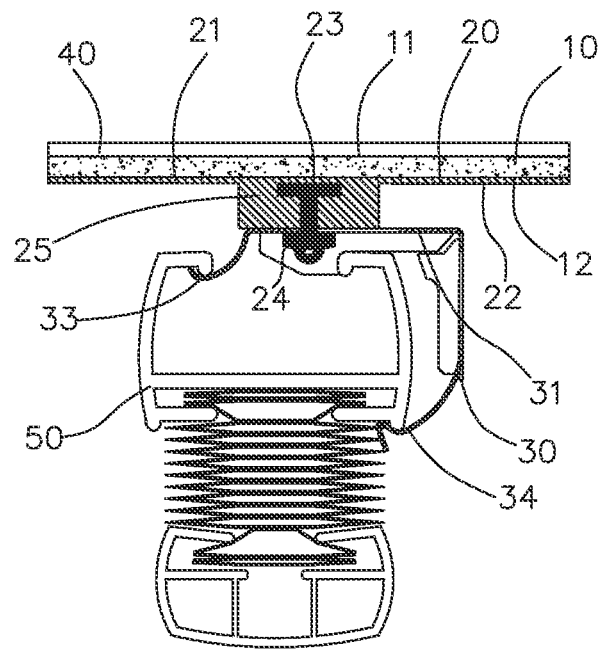
FIG. 6 shows that a curtain top rail of the curtain assembly is held by the holder of the present invention.

The holder 30 holds the curtain top rail 50 without using any bolt or screw to be connected to the wall of ceiling 40. This means that there will be no damage or holes needed to be drilled in the wall of ceiling 40. The pad 10, the attachment 20 and the holder 30 can also be easily removed. As shown in FIG. 5, the at least one bolt 23 is embedded in a hard plastic part 25, and the threaded section of the at least one bolt 23 extends from the hard plastic part 25 so as to be connected to the nut 24. The hard plastic part 25, the at least one bolt 23 and the attachment plate 20 are formed as a one-piece product which can be manufactured conveniently.

Figure 7:
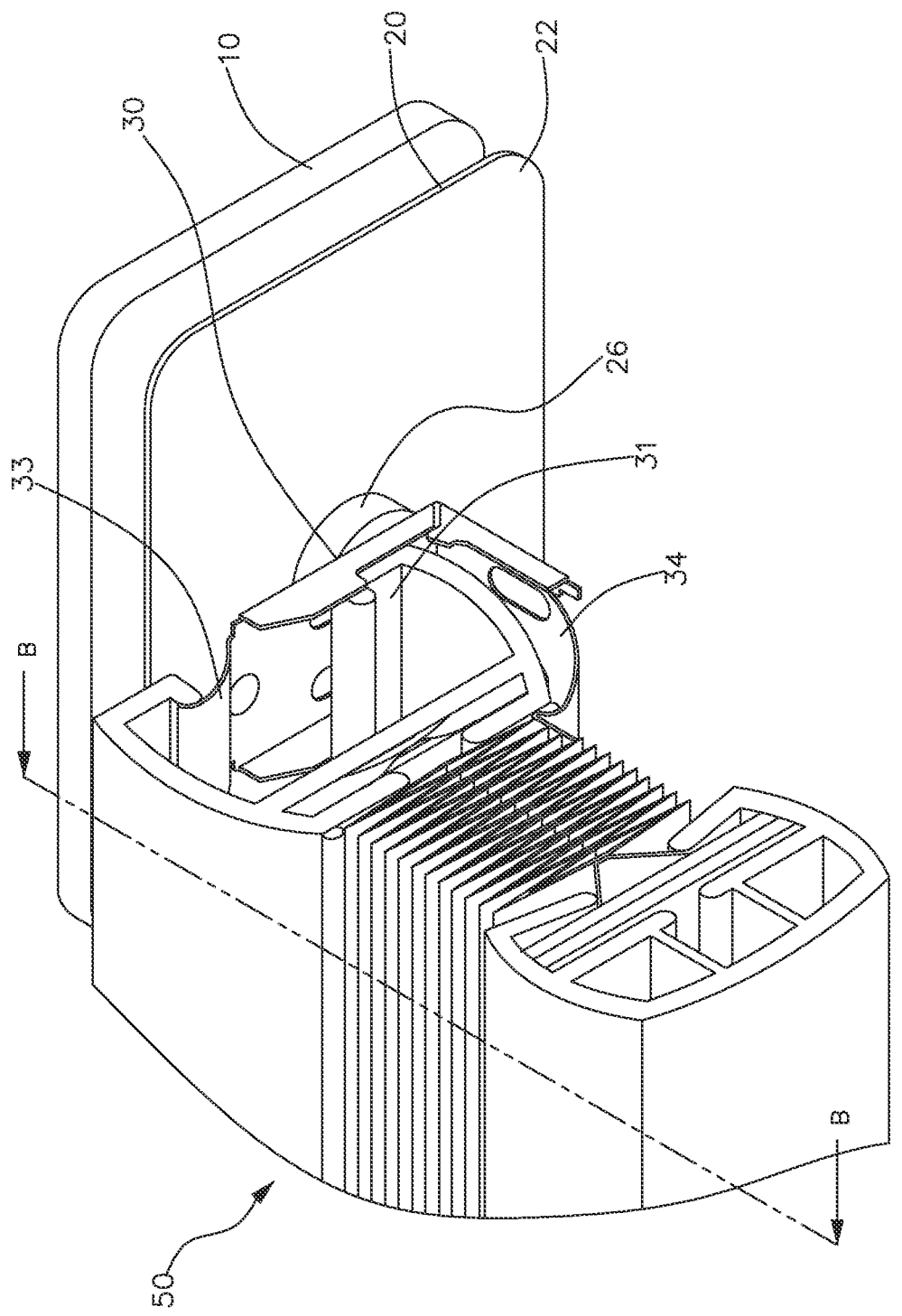
FIG. 7 shows a second embodiment of the present invention.
Figure 8:
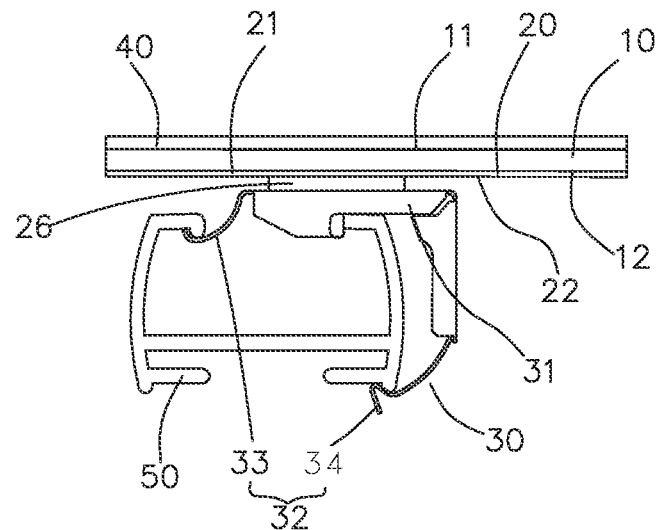
FIG. 8 is a side view of the second embodiment of the present invention.
Figure 9:
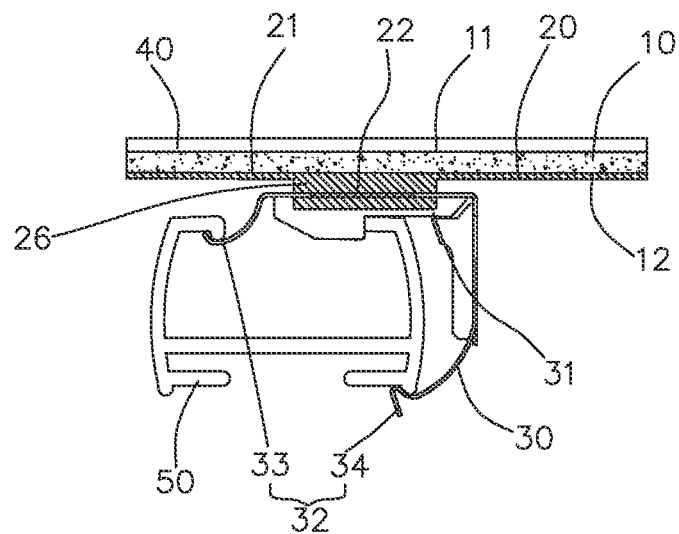
FIG. 9 is a cross sectional view, taken along line B-B in FIG. 7.

As shown in FIGS. 7 to 9, a second embodiment of the present invention is disclosed, and the difference between the second embodiment and the first embodiment is that the combination of the at least one bolt 23 and the nut 24 are replaced by a hard plastic connector 26. Specifically, the first part 31 of the holder 30 is secured to the second face 22 of the attachment plate 20 directly by the hard plastic connector 26. The attachment plate 20 and the holder 30 are formed as a one-piece product. The pad 10 is attached to the wall or ceiling 40, and the combination of the attachment plate 20 and the holder 30 is then connected to the pad 10. The curtain top rail 50 is then connected to the second part 32 of the holder 30.

The first part 31 of the holder 30 can also be connected to the second face 22 of the attachment plate 20 by any known method, such as a mortise-tenon structure.

While we have shown and described the embodiment in accordance with the present invention, it should be clear to those skilled in the art that further embodiments may be made without departing from the scope of the present invention.

What is claimed is:

1. A securing device for connecting a curtain top rail holder to a wall or ceiling, comprising:

an attachment plate including a first face and a second face which is located opposite to the first face, the first face adapted to be attached to a wall or ceiling, at least one bolt protruding from the second face;

a holder adapted to hold a curtain top rail, the holder including a first part and a second part, the first part connected to the at least one bolt which is connected with a nut, the second part including a first arm and a second arm, the first and second arms adapted to hold the curtain top rail, and a. pad including a first side and a second side which is located opposite to the first side, each of the first and second sides including an adherent layer, the first side adapted to be adhered to the wall or ceiling, the second side of the pad adhered to the first face of the attachment plate.

2. The securing device as claimed in claim 1, wherein the at least one bolt is embedded in a hard plastic part, a threaded section of the at least one bolt extends from the hard plastic part so as to be connected to the nut.

3. The securing device as claimed in claim 1, wherein the first part of the holder is secured to the second face of the attachment plate by a hard plastic connector.

4. The securing device as claimed in claim 1, wherein the first arm is adapted to be engaged with a portion of the curtain top rail, the second arm is adapted to be resiliently snapped to a lower portion of the curtain top rail.

* * * * *